J. C. CANFIELD.
SELF TIGHTENING BOLT AND NUT.
APPLICATION FILED JUNE 9, 1915.
1,212,126.
Patented Jan. 9, 1917.
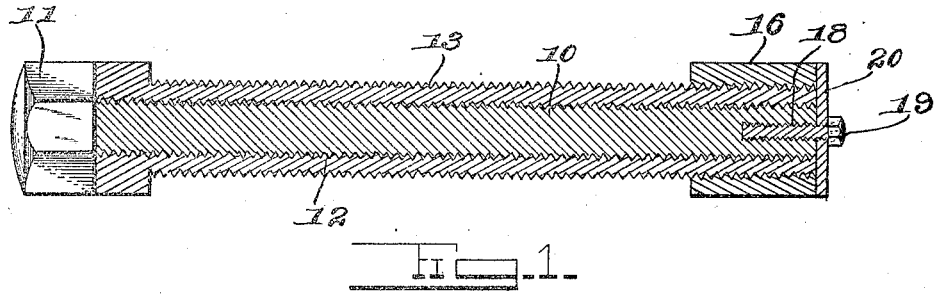
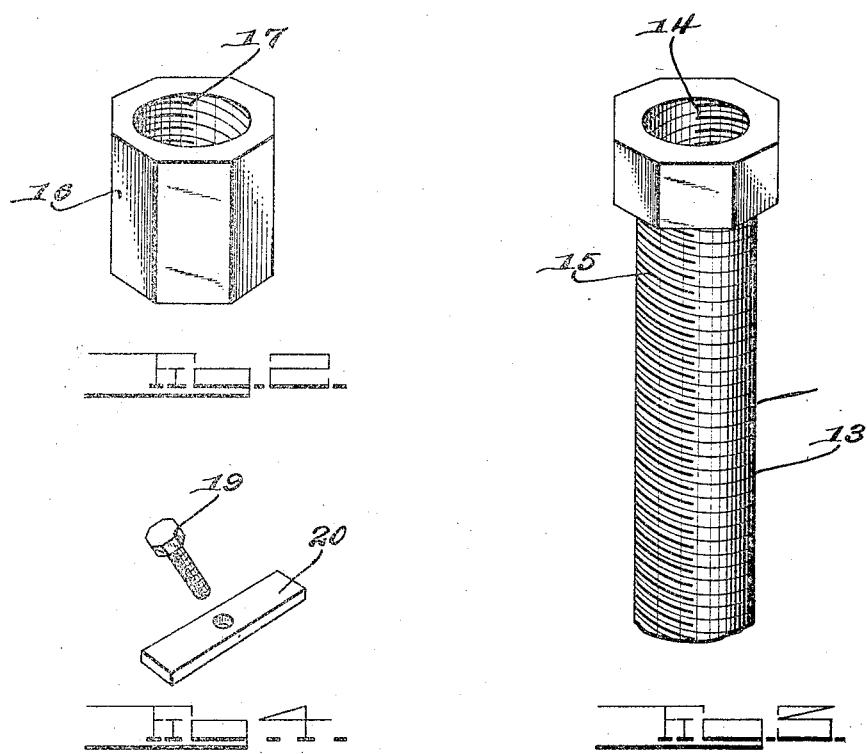
Inventor
Jesse C. Canfield
By
Attorney

UNITED STATES PATENT OFFICE.

JESSE C. CANFIELD, OF ELKINS, WEST VIRGINIA.

SELF-TIGHTENING BOLT AND NUT.

1,212,126.      Specification of Letters Patent.      Patented Jan. 9, 1917.

Application filed June 9, 1915. Serial No. 33,051.

*To all whom it may concern:*

Be it known that I, JESSE C. CANFIELD, a citizen of the United States, residing at Elkins, in the county of Randolph and State of West Virginia, have invented new and useful Improvements in Self-Tightening Bolts and Nuts, of which the following is a specification.

This invention is a bolt and nut capable of general application, and of the type wherein provision is made to prevent accidental unscrewing and separation of the parts, after the nut is once placed in the desired position.

The invention has for its object the provision of improved means to be interposed between a bolt and a nut, which will permit of ready positioning or removal of the parts, as may be desired, but which will normally react against the bolt and nut in such manner as to prevent relative rotation.

The invention will be hereinafter fully set forth and particularly pointed out in the claims.

In the accompanying drawing:—Figure 1 is a longitudinal sectional view of a bolt and nut, with the invention applied thereto. Fig. 2 is a detail perspective view of the nut. Fig. 3 is a similar view of the locking sleeve. Fig. 4 is a detail perspective view of the retaining cap and its securing device.

Referring to the drawing, 10 designates a bolt of ordinary construction, provided with the usual polygonal head 11, and threaded shank, the threads 12 on said shank being preferably right hand threads. The locking sleeve 13 is in the form of a tubular body provided with interior right hand screw threads 14, and exterior left hand screw threads 15, one end of the sleeve being of polygonal shape in cross section to provide means whereby the same may be readily engaged by a wrench. The nut 16 is provided with internal left hand threads 17, the exterior of the nut being provided with faces to be readily engaged by a wrench.

The shank of the bolt 10, is preferably provided with a threaded bore 18, extending in from the end thereof, left hand threads being provided, said threads being engaged by the correspondingly threaded shank of a securing bolt 19, designed to hold in position a retaining cap 20.

In practice, when it is desired to utilize the invention, the locking sleeve is screwed upon the shank of the bolt, the sleeve being readily rotated by means of a wrench engaging the polygonal end thereof. Said sleeve is then held by a wrench while the nut is being screwed thereon, and until the nut is placed in the desired position. Endwise movement of the bolt, sleeve and nut is then prevented by screwing in position the securing bolt 19, and by means thereof securing the retaining cap in position. When the parts are thus assembled, any tendency of the nut to rotate to the right, to unscrew the same, has a corresponding tendency to rotate the sleeve 13 in the same direction, the effect of which would be to move said sleeve in a direction to tighten the parts, but inasmuch as endwise movement is prevented, the threads of the sleeve will react against the threads of the bolt and nut in such manner as to positively prevent relative rotation. Likewise, if the bolt tends to rotate to the left, the oppositely pitched threads on the exterior of the sleeve will tend to tighten the nut. Furthermore, any tendency of the bolt to rotate in a direction to unscrew the sleeve, will tend to tighten the securing bolt 19, for the reason that the threads thereof are pitched opposite to the threads of the bolt. When it is desired to separate the parts, the retaining cap and securing bolt are first removed, whereupon the nut 14 may be removed in the usual way while the sleeve 13 is being held by a wrench. After the nut has been removed, relative rotation of the sleeve and the bolt may be readily accomplished to separate the same. Bolt 19 and cap 20 will take up and tighten the wear or loosening caused by jars or vibrations in the operation of the parts.

Having thus explained the nature of my invention and described an operative manner of constructing and using the same, although without attempting to set forth all of the forms of its use, or all of the forms in which it may be made, what I claim is:—

1. The combination with a bolt provided with a threaded shank, of a sleeve having internal threads complemental to the threads of said bolt, said sleeve having external threads of a pitch opposite to the pitch of the internal threads, a nut having threads complemental to the exterior threads of said sleeve, and means engaging contiguous ends of the nut and sleeve for preventing movement of said nut and said sleeve longitudinally of said bolt.

2. The combination with a bolt provided with a threaded shank, of a sleeve having an external angular portion at one end and internal threads complemental to the threads of said bolt, said sleeve having external threads of a pitch opposite to the pitch of the internal threads, a nut having threads complemental to the exterior threads of said sleeve, and means engaging contiguous ends of the nut and sleeve for preventing movement of said nut and said sleeve longitudinally of said bolt.

3. The combination with a bolt provided with a threaded shank, of a sleeve having internal threads complemental to the threads of said bolt, said sleeve having external threads of a pitch opposite to the pitch of the internal threads, a nut having threads complemental to the exterior threads of said sleeve, a retaining cap to prevent movement of said nut and sleeve longitudinally of said bolt, and means for securing said cap in operative position.

4. The combination with a bolt provided with a threaded shank having a threaded bore in one end, the threads of said bore being opposite in pitch to those of the shank, of a locking sleeve having internal threads complemental to the threads of said bolt, and external threads of a pitch opposite to the pitch of the internal threads, a nut having threads complemental to the external threads of said sleeve, a retaining cap, and a securing bolt for said cap engaging the threaded bore of said first mentioned bolt.

In testimony whereof I have hereunto set my hand in presence of two subscribing witnesses.

JESSE C. CANFIELD.

Witnesses:
W. H. KEIM,
B. A. NEWBERRY.